(12) United States Patent
Aou et al.

(10) Patent No.: US 10,450,401 B2
(45) Date of Patent: Oct. 22, 2019

(54) POLYURETHANE FOAM WITH AQUEOUS POLYMER DISPERSION

(71) Applicants: Dow Global Technologies LLC, Midland, MI (US); Rohm and Haas Company, Philadelphia, PA (US)

(72) Inventors: Kaoru Aou, Lake Jackson, TX (US); Joseph Jacobs, Yardley, PA (US); Christopher Thiede, Lake Jackson, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/533,893

(22) PCT Filed: Dec. 15, 2015

(86) PCT No.: PCT/US2015/065762
§ 371 (c)(1),
(2) Date: Jun. 7, 2017

(87) PCT Pub. No.: WO2016/100306
PCT Pub. Date: Jun. 23, 2016

(65) Prior Publication Data
US 2017/0320995 A1 Nov. 9, 2017

Related U.S. Application Data (60) Provisional application No. 62/093,068, filed on Dec. 17, 2014.

(51) Int. Cl.
| | | |
|---|---|---|
| C08G 18/08 | (2006.01) | |
| C08G 18/16 | (2006.01) | |
| C08G 18/18 | (2006.01) | |
| C08G 18/24 | (2006.01) | |
| C08G 18/40 | (2006.01) | |
| C08G 18/63 | (2006.01) | |
| C08G 18/76 | (2006.01) | |
| C08L 23/08 | (2006.01) | |
| C08L 33/02 | (2006.01) | |
| C08L 75/08 | (2006.01) | |
| C08G 18/48 | (2006.01) | |
| C08G 101/00 | (2006.01) | |

(52) U.S. Cl.
CPC ....... *C08G 18/0866* (2013.01); *C08G 18/165* (2013.01); *C08G 18/18* (2013.01); *C08G 18/1833* (2013.01); *C08G 18/24* (2013.01); *C08G 18/244* (2013.01); *C08G 18/246* (2013.01); *C08G 18/4072* (2013.01); *C08G 18/4816* (2013.01); *C08G 18/4837* (2013.01); *C08G 18/4841* (2013.01); *C08G 18/632* (2013.01); *C08G 18/7621* (2013.01); *C08L 75/08* (2013.01); *C08G 2101/0083* (2013.01)

(58) Field of Classification Search
CPC .. C08G 18/0866; C08G 18/165; C08G 18/18; C08G 18/1833; C08G 18/24; C08G 18/244; C08G 18/246; C08G 18/2837; C08G 18/2841; C08G 18/4072; C08G 18/4816; C08G 18/632; C08G 18/7621; C08G 2101/0083; C08L 75/08
See application file for complete search history.

(56) References Cited

U.S. PATENT DOCUMENTS

| | | | |
|---|---|---|---|
| 4,596,665 A | 6/1986 | Gonzalez et al. | |
| 4,599,392 A | 7/1986 | McKinney et al. | |
| 4,929,646 A | 5/1990 | Nichols et al. | |
| 4,988,781 A | 1/1991 | McKinney et al. | |
| 6,080,800 A | 6/2000 | Frey et al. | |
| 6,265,457 B1 | 7/2001 | Dolgopolsky et al. | |
| 6,512,024 B1 | 1/2003 | Lundgard et al. | |
| 8,318,257 B2 | 11/2012 | Neubauer et al. | |
| 2005/0027026 A1 | 2/2005 | Kinoshita | |
| 2010/0099785 A1 | 4/2010 | Rister, Jr. et al. | |

(Continued)

FOREIGN PATENT DOCUMENTS

| | | |
|---|---|---|
| EP | 2476714 A1 | 7/2012 |
| JP | 2001323155 A | 11/2001 |

OTHER PUBLICATIONS

PCT/US2015/065762, International Search Report & Written Opinion dated May 3, 2016.

(Continued)

*Primary Examiner* — Melissa A Rioja (57) ABSTRACT

A reaction system for forming a polyurethane foam includes an isocyanate component that has at least one isocyanate and an isocyanate-reactive component that is a mixture formed by adding at least a polyol component, an additive component, and a preformed aqueous polymer dispersion. The mixture includes, based on the total weight of the mixture, from 50.0 wt % to 99.8 wt % of a polyol component including at least one polyether polyol, from 0.1 wt % to 50.0 wt % of an additive component including at least one catalyst, and from 0.1 wt % to 6.0 wt % of a preformed aqueous polymer dispersion. The preformed aqueous polymer dispersion has a solids content from 10 wt % to 80 wt %, based on the total weight of the preformed aqueous polymer dispersion, and is one of an aqueous acid polymer dispersion or an aqueous acid modified polyolefin polymer dispersion in which the polyolefin is derived from at least one $C_2$ to $C_{20}$ alpha-olefin.

9 Claims, 1 Drawing Sheet

(56) References Cited

U.S. PATENT DOCUMENTS

2011/0166244 A1   7/2011  Mortelmans et al.
2013/0178550 A1   7/2013  Aou et al.
2013/0225706 A1   8/2013  Ma et al.
2017/0362375 A1*  12/2017 Aou .................... C08G 18/2063

OTHER PUBLICATIONS

PCT/US2015/065762, International Preliminary Report on Patentability dated Jun. 29, 2017.

* cited by examiner

FIG. 1

POLYURETHANE FOAM WITH AQUEOUS POLYMER DISPERSION

FIELD

Embodiments relate to polyurethane foams prepared using a preformed aqueous polymer dispersion and a method of manufacturing such polyurethane foams.

INTRODUCTION

Polyurethane foam (such as high resiliency foam, conventional foam/slabstock foam, low-density foam, high-density foam, rigid foam, and/or viscoelastic foam) is characterized by the formation of polyurethane polymers. The polyurethane polymers may be thermosetting polymers For example, the polyurethane polymers may be used in foam products such as seating, rigid foam panels, elastomeric products (such as seals, gaskets, wheels, tires, etc.) adhesives, coatings, sealants, comfort applications (such as bedding and pillows), shock absorbing applications (such as in athletic padding and helmets), and soundproof applications (such as automotive interiors).

SUMMARY

Embodiments may be realized by providing a reaction system for forming a polyurethane foam that has a resiliency greater than 20% as measured according to ASTM D 3574, the reaction system including an isocyanate component that has at least one isocyanate and an isocyanate index of the reaction system is from 70 to 150; and an isocyanate-reactive component that is a mixture formed by adding at least a polyol component, an additive component, and a preformed aqueous polymer dispersion. The mixture includes from 50.0 wt % to 99.8 wt % of a polyol component, based on the total weight of the mixture, the polyol component including at least one polyether polyol, from 0.1 wt % to 50.0 wt % of an additive component, based on the total weight of the mixture, that includes at least one catalyst, and from 0.1 wt % to 6.0 wt % of a preformed aqueous polymer dispersion, based on the total weight of the mixture. The preformed aqueous polymer dispersion has a solids content from 10 wt % to 80 wt %, based on the total weight of the preformed aqueous polymer dispersion, and is one of an aqueous acid polymer dispersion or an aqueous acid modified polyolefin polymer dispersion in which the polyolefin is derived from at least one $C_2$ to $C_{20}$ alpha-olefin.

DETAILED DESCRIPTION

A polyurethane foam (such as a conventional flexible foam and/or a high resiliency foam) may be characterized as having a resiliency that is greater than 20% as measured according to ASTM D 3574 (may also be referred to as a Ball Rebound Test). For example, the resiliency may be from greater than 20% and up to 45% for a conventional flexible foam. The resiliency may be greater than 45% for a high resiliency foam. For example, the resiliency may be less than 75% for the high resiliency foam.

The polyurethane foams may be prepared using a reaction system that includes an isocyanate component and an isocyanate-reactive component. In particular, the polyurethane foam is formed as the reaction product of the isocyanate component and the isocyanate-reactive component. The isocyanate component includes at least one isocyanate such as an isocyanate-terminated prepolymer and/or a polyisocyanate. The isocyanate-reactive component includes at least one compound having an isocyanate reactive hydrogen atom group, such as a hydroxyl group and/or an amine group. The isocyanate component and/or the isocyanate-reactive component may include an additive such a catalyst, a curing agent, a surfactant, a blowing agent, a polyamine, and/or a filler.

According to embodiments, the isocyanate-reactive component includes at least three components. In particular, the isocyanate-reactive component includes a polyol component, an additive component, and a preformed aqueous polymer dispersion.

The polyol component accounts for 50.0 wt % to 99.8 wt % (e.g., 60.0 wt % to 99.8 wt %, 70.0 wt % to 99.5 wt %, 80.0 wt % to 99.0 wt %, 90.0 wt % to 99.0 wt %, etc., so as to be the majority component in the reaction system for forming the polyurethane polyurethane foam) of the isocyanate-reactive component. The polyol component includes at least one polyether polyol and may optionally include at least one polyester polyol.

The additive component may include a catalyst, a curing agent, a surfactant, a blowing agent, a polyamine, water, and/or a filler. The additive component accounts for 0.1 wt % to 50.0 wt % (e.g., 0.1 wt % to 40.0 wt %, 0.1 wt % to 30.0 wt %, 0.1 wt % to 20.0 wt %, 0.1 wt % to 15.0 wt %, 0.1 wt % to 10.0 wt %, 0.1 wt % to 5.0 wt %, etc.) of the additive component, based on the total weight of the isocyanate-reactive component. The additive component in exemplary embodiments includes at least one catalyst and at least one surfactant.

The preformed aqueous polymer dispersion accounts for 0.1 wt % to 6.0 wt % (e.g., 0.1 wt % to 5.0 wt %, 0.1 wt % to 4.1 wt %, 0.1 wt % to 4.0 wt %, 0.1 wt % to 3.5 wt %, 0.1 wt % to 3.0 wt %, 0.4 wt % to 2.5 wt %, 0.5 wt % to 2.4 wt %, etc.) of the isocyanate-reactive component. The preformed aqueous polymer dispersion is one of an aqueous acid polymer dispersion or an aqueous acid-modified polyolefin polymer dispersion in which the polyolefin is derived from at least one $C_2$ to $C_{20}$ alpha-olefin (e.g., at least one $C_2$ to $C_{10}$ alpha-olefin and/or $C_2$ to $C_8$ alpha-olefin). The preformed aqueous polymer dispersion has a solids content from 10 wt % to 80 wt %, based on the total weight of the preformed aqueous polymer dispersion. The aqueous polymer dispersion may be a combination of one or more aqueous polymer dispersions that are used to form the polyurethane foam.

The polyurethane foam prepared using the preformed aqueous polymer dispersion additive may have an air flow greater than 5.0 standard cubic foot per minute (scfm) (approximately 2.4 L/s) under standard conditions. For example, a polyurethane foam may be prepared that has an increased air flow without sacrificing resiliency.

Preformed Aqueous Polymer Dispersion

The aqueous polymer dispersion includes at least (a) a base polymer including an acid polymer and/or an acid-modified polyolefin polymer and (b) a fluid medium (in this case water), in which the base polymer is dispersed in the fluid medium. The preformed aqueous polymer dispersion may be a continuous liquid phase component at ambient conditions of room temperature and atmospheric pressure and is derived from a liquid phase (i.e., the fluid medium) and a solid phase (i.e., the base polymer).

In embodiments, the preformed aqueous polymer dispersion is one of an aqueous acid polymer dispersion or an aqueous acid-modified polyolefin polymer dispersion in which the polyolefin is derived from at least one $C_2$ to $C_{20}$ alpha-olefin. By aqueous acid polymer dispersion it is meant an aqueous dispersion prepared with an acid based polymer. By aqueous acid-modified polyolefin polymer dispersion it is meant an aqueous dispersion prepared with an acid-modified polyolefin polymer. By derived from at least one $C_2$ to $C_{20}$ alpha-olefin it is meant that the polyolefin is a polymer prepared using at least one alpha-olefin, in which each alpha-olefin used is one of a $C_2$ to $C_{20}$ alpha-olefin (e.g., the polyolefin may be derived from at least one of ethylene, propylene, butylene, hexene, and/or octene). In exemplary embodiments, the polyolefin may be an ethylene based polymer and/or a propylene based polymer As used herein, by polymer it meant a compound prepared by polymerizing monomers, whether of the same or a different type. Thus, the term polymer embraces the term homopolymer, usually employed to refer to polymers prepared from only one type of monomer, and the term interpolymer. It also embraces all forms of interpolymers, e.g., random, block, homogeneous, heterogeneous, etc. By copolymer/interpolymer it is meant a polymer prepared by the polymerization of at least two different types of monomers. These terms include both classical copolymers, i.e., polymers prepared from two different types of monomers, and polymers prepared from more than two different types of monomers, e.g., terpolymers, tetrapolymers, etc.

By ethylene based polymer it is meant a polymer that includes a majority weight percent polymerized ethylene monomer (based on the total weight of polymerizable monomers), and optionally may comprise at least one polymerized comonomer different from ethylene (such as at least one selected from a $C_3$ to $C_{20}$ alpha-olefin) so as to form an ethylene-based interpolymer. For example, when the ethylene-based polymer is an ethylene-propylene copolymer, the amount of ethylene may be greater than 50 wt %, based on the total weight to the copolymer. "Units derived from ethylene" and like terms mean the units of a polymer that formed from the polymerization ethylene monomers.

By propylene based polymer it is meant a polymer that includes a majority weight percent polymerized propylene monomer (based on the total weight of polymerizable monomers), and optionally may comprise at least one polymerized comonomer different from propylene (such as at least one selected from a $C_2$ and $C_4$ to $C_{20}$ alpha-olefin) so as to form an propylene-based interpolymer. For example, when the propylene-based polymer is a propylene-ethylene copolymer, the amount of propylene may be greater than 50 wt %, based on the total weight to the copolymer. "Units derived from propylene" and like terms mean the units of a polymer that formed from the polymerization propylene monomers.

Exemplary aqueous acid polymer dispersion may include ethylene-acrylic acid interpolymers, ethylene-methacrylic acid interpolymers, and/or ethylene-crotonic acid interpolymers. The ethylene-acrylic acid interpolymer is prepared by the copolymerization of at least ethylene and acrylic acid. The ethylene-methacrylic acid interpolymer is prepared by copolymerization of at least ethylene and methacrylic acid. The ethylene-crotonic acid interpolymer is prepared by copolymerization of at least ethylene and crotonic acid. It is understood that in such an aqueous acid polymer dispersion, exemplary embodiments are not limited to just ethylene-acrylic acid interpolymers, ethylene-methacrylic acid interpolymers, and/or ethylene-crotonic acid interpolymers. For example, ethylene can be copolymerized with more than one of the following: acrylic acid, methacrylic acid, and/or crotonic acid.

Exemplary aqueous acid polymer dispersions may include at least one ethylene-acrylic acid (EAA) copolymer (and/or ethylene-methacrylic acid copolymer) as the base polymer that is dispersed in the fluid medium (in this case water). The dispersion may be enabled by BLUEWAVE™ Technology, which is a proprietary and patented mechanical-dispersion technology that is a trademark of The Dow Chemical Company or an affiliated company of The Dow Chemical Company. For example, the EAA may be prepared by copolymerization of ethylene with acrylic acid, which yields ethylene-acrylic acid EAA copolymers. The ethylene-acrylic acid copolymer may have an acrylic acid content of at least 10 wt % (e.g., from 10 wt % to 70 wt %, from 10 wt % to 60 wt %, from 10 wt % to 50 wt %, from 10 wt % to 40 wt %, from 10 wt % to 30 wt %, and/or from 15 wt % to 25 wt %). Exemplary EAA copolymers are available as PRIMACOR™ products, available from THE DOW CHEMICAL COMPANY. The EAA copolymer may have a melt index from 100 to 2000 g/10 minute (ASTM Method D-1238 at 190° C. and 2.16 kg). The EAA copolymer may have a Brookfield viscosity from 5,000 to 13,000 cps at 350° F., and is available from The Dow Chemical Company.

The ethylene-methacrylic acid copolymer may be prepared by copolymerization of ethylene with methacrylic acid. Exemplary, ethylene-acrylic acid, ethylene-methacrylic acid, and/or ethylene-crotonic acid copolymers are discussed in U.S. Pat. No. 4,599,392 and/or U.S. Pat. No. 4,988,781.

Exemplary aqueous acid-modified polyolefin polymer dispersions include dispersions sold as HYPOD™ products, available from The Dow Chemical Company. The HYPOD™ products may be enabled by BLUEWAVE™ Technology, which is a proprietary and patented mechanical-dispersion technology that is a trademark of The Dow Chemical Company or an affiliated company of The Dow Chemical Company. BLUEWAVE™ Technology may utilize a high-shear mechanical process that may work by taking traditional thermoplastic polymers and elastomers and breaking them up into submicron particles. The aqueous acid-modified polymer polymer dispersions may include propylene based dispersions and ethylene-based dispersions, which may combine the performance of high-molecular-weight thermoplastics and elastomers with the application advantages of a high-solids waterborne dispersion. The polyolefin of the dispersion may be a metallocene catalyzed polyolefin. Exemplary polyolefins are sold in the AFFINITY™, ENGAGE™, VERSIFY™, and INFUSE™ products, available from The Dow Chemical Company.

The aqueous polymer dispersion may be prepared by using a neutralizing agent. Exemplary neutralizing agents include ammonia, ammonium hydroxide, potassium hydroxide, sodium hydroxide, lithium hydroxide, and combinations thereof. For example, if a polar group of the base polymer is acidic or basic in nature, the polymer may be partially or fully neutralized with a neutralizing agent to form a corresponding salt. With the acid polymer modified dispersion prepared using EAA is used, the neutralizing agent is a base, such as ammonium hydroxide, potassium hydroxide, and/or sodium hydroxide. Those having ordinary skill in the art will appreciate that the selection of an appropriate neutralizing agent may depend on the specific composition formulated, and that such a choice is within the knowledge of those of ordinary skill in the art.

Figure 1:
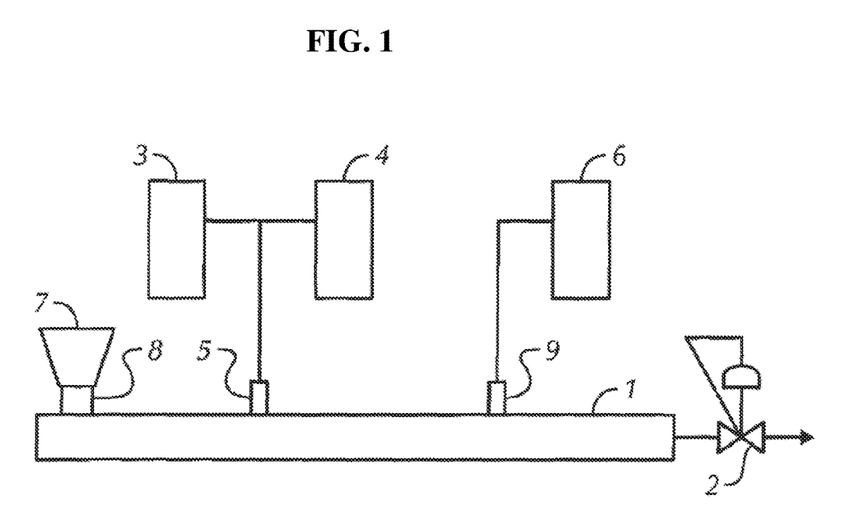
FIG. 1 illustrates an exemplary schematic representation of a melt-extrusion apparatus used to prepare a preformed aqueous polymer dispersion.

The aqueous polymer dispersion may be prepared in an extrusion process, e.g., as discussed in U.S. Pat. No. 8,318,257. FIG. 1 illustrates an exemplary a schematic diagram of an extrusion apparatus for manufacturing an aqueous polymer dispersions. An extruder 1 (such as a twin screw extruder) may be coupled to a pressure control device 2 (such as a pressure control valve, a back pressure regulator, a melt pump, and/or a gear pump). A neutralizing agent reservoir 3 and an initial water reservoir 4, each of which includes a pump (not shown), may be provided in connection with the extruder 1. The desired amounts of neutralizing agent and initial water are provided from the neutralizing agent reservoir 3 and the initial water reservoir 4, respectively. Any suitable pump may be used, e.g., based on the desired flow. The neutralizing agent and initial water may be preheated in a preheater.

Polymer resin (such as an acid polymer and/or a polyolefin polymer) may be fed from the feeder 7 to an inlet 8 of the extruder 1, where the resin is melted or compounded. The polymer resin may be provided in the form of pellets, powder, and/or flakes, for example. A dispersing agent may be added to the extruder through and along with the polymer resin or may be provided separately to the extruder 1. For example, the polymer (and dispersing agent if included) may be melted, mixed, and conveyed by screws in a mix and convey zone. The polymer resin melt is then delivered from the mix and convey zone to an emulsification zone of the extruder where the initial amounts of water and neutralizing agent (from the reservoirs 3 and 4) are added through an inlet 5. The resultant emulsified mixture may be further diluted at least one time using an additional water via inlet 9 from reservoir 6 in a dilution and cooling zone of the extruder 1. As would be understood by a person of ordinary skill in the art, at least in view of U.S. Pat. No. 8,318,257, the dilution scheme of the resultant emulsified mixture may be varied (e.g., based on the desired solids content). For example, the emulsified mixture may be further diluted with additional dispersion medium from additional reservoirs in a dilution zone of the extruder 1. The dispersion may be diluted to at least 30 weight percent dispersion in the dilution zone.

With respect to the screws in the mix and convey zone, one or more rotating restriction orifices may be located along the screw. The rotating restriction orifice may improve stability of the dispersion forming process. Non-rotating restriction orifices may be used. The screws may include high-mixing kneading disks, in some embodiments. In addition to the high-mixing kneading disks 60 described above and optionally low free volume kneading disks 62, which may minimize the volume weighted particle size distribution of dispersions formed using the extruder 1.

The extruder 1 includes high internal phase emulsion creation (HIPE) zones along a length thereof, e.g., as discussed in U.S. Pat. No. 8,318,257. For example, the aqueous polymer dispersion may be prepared using a system that incorporates 12 HIPE zones, in which the temperature is varied in the zones. Depending upon the feed composition (such as the polymer, dispersing agent, neutralizing agent, etc.), it may be desirable to have a longer or a shorter HIPE zones. Multiple dispersion medium injection points may be provided to allow the HIPE zones to be extended or shortened as needed. As the particle size of the dispersed polymer particles is formed in the HIPE zone, adequate mixing should be provided to develop the desired particle size. Having a variable length for the HIPE zone may allow for a broader range of polymers to be processed in a single extruder, providing for process flexibility, among other benefits.

The twin screw extruder barrels, screws, and dilution medium injection points may be varied such that the length to diameter (L/D) of the HIPE zone is at least 16 when producing EEA containing dispersions. The apparatuses described above may be used to produce dispersions, where, in some embodiments, the polymer feed rate may range from about 50 to about 2000 lb/h (about 22 to about 907 kg/h). In other embodiments, the polymer feed rate may range from about 100 to about 1000 lb/h (between about 45 and about 454 kg/h). In other embodiments, the screw speed may range from about 300 rpm to about 1200 rpm. In yet other embodiments, the extruder discharge pressure may be maintained at a pressure ranging from about 300 to about 800 psig (from about 21 bar to about 56 bar).

Polyol Component

The polyol component includes at least one polyether polyol and/or polyester polyol. Exemplary polyether polyols are the reaction product of alkylene oxides (such as at least one ethylene oxide, propylene oxide, and/or butylene oxide) with initiators containing from 2 to 8 active hydrogen atoms per molecule. Exemplary initiators include ethylene glycol, diethylene glycol, propylene glycol, dipropylene glycol, butane diol, glycerol, trimethylolpropane, triethanolamine, pentaerythritol, sorbitol, ethylene diamine, tolylene diamine, diaminodiphenylmethane, polymethylene polyphenylene polyamines, ethanolamine, diethanolamine, and mixtures of such initiators. Exemplary polyols include VORANOL™ and VORALUX™ products, available from The Dow Chemical Company. The polyol component may include polyols that are useable to form polyurethane foams.

For example, the polyol component may include at least one polyoxypropylene-polyoxyethylene polyether polyol that has an ethylene oxide content of less than 20 wt %, has a hydroxyl functionality from 1.5 to 5.2 (e.g., 2.0 to 4.5 and/or 2.5 to 4.5), and has an hydroxyl equivalent weight from 200 g/mol equivalents to 2200 g/mol equivalents (e.g., 300 g/mol equivalents to 2100 g/mol equivalents, 500 g/mol equivalents to 2000 g/mol equivalents, 800 g/mol equivalents to 1950 g/mol equivalents, and/or 1000 g/mol equivalents to 1900 g/mol equivalents). For example, the polyoxypropylene-polyoxyethylene polyether polyol may be considered a triol or tetraol.

The polyoxypropylene-polyoxyethylene polyether polyol may account for at least 50 wt % and up to 99 wt % (e.g., from 60 wt % to 99 wt %, from 70 wt % to 99 wt %, from 75 wt % to 99 wt %, from 75 wt % to 98 wt %, from 80 wt % to 98 wt %, from 85 wt % to 98 wt %, and/or from 90 wt % to 98 wt %) of the isocyanate-reactive component, e.g., when the polyol component is used to make a conventional flexible foam/slabstock foam. When the polyoxypropylene-polyoxyethylene polyether polyol is used in conventional flexible foam/slabstock foam, the hydroxyl equivalent weight may be from 800 g/mol equivalents to 1500 g/mol equivalents, and/or 1000 g/mol equivalents to 1300 g/mol equivalents.

The polyoxypropylene-polyoxyethylene polyether polyol may account for at least 50 wt % and up to 99 wt % (e.g., from 55 wt % to 99 wt %, from 60 wt % to 95 wt %, from 65 wt % to 90 wt %, from 70 wt % to 85 wt %, and/or from 70 wt % to 80 wt %) of the isocyanate-reactive component, e.g., when the polyol component is used to make a high resiliency foam. When the polyoxypropylene-polyoxyethylene polyether polyol is used in high resiliency foam, the hydroxyl equivalent weight may be from 1000 g/mol equivalents to 2000 g/mol equivalents, and/or 1500 g/mol equivalents to 1950 g/mol equivalents.

For example, the polyol component may include a polyoxyethylene-polyoxypropylene polyether polyol that has an ethylene oxide content of at least 50 wt % (at least 60 wt % and/or at least 65 wt %, and a remainder of units derived from propylene oxide) that has a hydroxyl functionality from 2.7 to 8.2 (e.g., 4.0 to 7.5, 5.0 to 7.5, and/or 6.5 to 7.2), and has an hydroxyl equivalent weight from 200 g/mol equivalents to 2200 g/mol equivalents (e.g., 300 g/mol equivalents to 2100 g/mol equivalents, 800 g/mol equivalents to 2000 g/mol equivalents, 1000 g/mol equivalents to 1950 g/mol equivalents, and/or 1500 g/mol equivalents to 1950 g/mol equivalents). The polyoxyethylene-polyoxypropylene polyether polyol that has an ethylene oxide content of at least 50% may account for 5 wt % to 90 wt % (e.g., 5 wt % to 70 wt %, 10 wt % to 50 wt %, 10 wt % to 40 wt %, 15 wt % to 35 wt %, and/or 20 wt % to 30 wt %) of the isocyanate-reactive component, e.g., when the polyol component is used to make a high resiliency foam. The polyoxyethylene-polyoxypropylene polyether polyol that has an ethylene oxide content of at least 50 wt % may be the minority component in the isocyanate-reactive component when forming the high resiliency foam, e.g., may be present in a lesser amount that the polyoxypropylene-polyoxyethylene polyether polyol that as an ethylene oxide content of less than 20 wt %.

The polyol component may include a styrene acrylonitrile-based copolymer polyol (i.e., a SANs copolymer polyol). The SANs copolymer polyol may include a conventional petroleum-based polyols (e.g., a polyether polyol) that includes SAN polymer particles dispersed therein. Preparation of the SAN polymer polyols may include preparation (by the in situ polymerization) of a mixture of acrylonitrile and styrene in a polyol. Methods known in the art may be used. The ratio of styrene to acrylonitrile polymerized in situ in the polyol may be in the range of from 0:100 to 100:0 parts by weight (e.g., from 80:20 to 20:80), based on the total weight of the styrene/acrylonitrile mixture. The SANs copolymer polyol may have hydroxyl values within the range of from 10 to 200 and/or from 20 to 60. The SANs copolymer polyols may have a solids content from 5 wt % to 70 wt %, from 10 wt % to 65 wt %, from 15 wt % to 60 wt %, from 25 wt % to 55 wt %, from 30 wt % to 55 wt %, and/or from 40 wt % to 50 wt %. The SANs copolymer polyol may account for less than 50 wt % of the isocyanate-reactive component, e.g., when the polyol component is used to make a high resiliency foam. For example, the amount of the SANs copolymer polyol may be from 0.5 wt % to 50.0 wt %, from 1.0 wt % to 30.0 wt %, from 1.0 wt % to 20.0 wt %, and/or from 1.0 wt % to 5.0 wt %.

In an exemplary embodiment, the polyol component may include a blend of the polyoxyethylene-polyoxypropylene polyether polyol that has an ethylene oxide content of at least 50 wt %, the polyoxyethylene-polyoxypropylene polyether polyol that has an ethylene oxide content of less than 20 wt %, and the polyoxypropylene polyether polyol.

The polyol component may be mixed with the preformed aqueous polymer dispersion (and optionally at least part of the additive component) before contacting the isocyanate component.

Additive Component

The additive component is separate from the components that form the preformed aqueous dispersion and the polyol component. The additive component is part of the isocyanate-reactive component, but other additives may be incorporated into the isocyanate component. The additive component may include a catalyst, a curing agent, a crosslinker, a surfactant, a blowing agent (aqueous and non-aqueous, separate from the aqueous polymer dispersion), a polyamine, a plasticizer, a fragrance, a pigment, an antioxidant, a UV stabilizer, water (separate from the aqueous polymer dispersion), and/or a filler. Other exemplary additives include a chain extender, flame retardant, smoke suppressant, drying agent, talc, powder, mold release agent, rubber polymer ("gel") particles, and other additives that are known in the art for use in polyurethane foams and polyurethane foam products.

The additive component may include tin catalyst, zinc catalyst, bismuth catalyst, and/or amine catalyst. The total amount of catalyst in the isocyanate-reactive component may be from 0.1 wt % to 3.0 wt %.

A surfactant may be included in the additive component, e.g., to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters, and alkyl arylsulfonic acids may be used. For example, the formulation may include a surfactant such as an organosilicone surfactant. The total amount of an organosilicone surfactant in the isocyanate-reactive component may be from 0.1 wt % to 5.0 wt %, 0.1 wt % to 3.0 wt %, 0.1 wt % to 2.0 wt %, and/or 0.1 wt % to 1.0 wt %.

The additive component may include water, which is separate from the preformed aqueous polymer dispersion. The water may account for less than 2.0 wt % of the total weight of isocyanate-reactive component. The total water, including water from the preformed aqueous polymer dispersion and water from the additive component, may account for less than 5 wt % of the total weight of isocyanate-reactive component.

The additive component may exclude any conventional polyurethane foam chemical cell openers based on the use of the aqueous polymer dispersion. The additive component may exclude polybutene, polybutadiene, and waxy aliphatic hydrocarbons such as oils (e.g., mineral oil, paraffin oil, and/or naphthenic oil) that are commonly employed cell openers in low resiliency foams. The additive component may exclude cell openers that are polyols derived primarily from alkoxylation of a43-alkylene oxides having at least 4 carbon atoms, e.g., as discussed U.S. Pat. No. 4,596,665. The additive component may exclude cell openers that are polyethers of up to about 3500 molecular weight that contain a high proportion (usually 50 percent or higher) of units derived from ethylene oxide or butylene oxide, e.g., as discussed in the background section of U.S. Pat. No. 4,863,976. The additive component may exclude cell openers that are polyether polyols having a molecular weight of at least 5000 and having at least 50 wt % of oxyethylene units, e.g., as discussed in the claims of U.S. Pat. No. 4,863,976.

Isocyanate Component

The isocyanate component includes at least one isocyanate. The isocyanate component is present at an isocyanate index from 70 to 150 (e.g., 85 to 140, 90 to 130, 95 to 120, 95 to 115, and/or 100 to 110). The isocyanate index is defined as the molar stoichiometric excess of isocyanate moieties in a reaction mixture with respect to the number of moles of isocyanate-reactive units (active hydrogens available for reaction with the isocyanate moiety), multiplied by 100. An isocyanate index of 100 means that there is no stoichiometric excess, such that there is 1.0 mole of isocyanate groups per 1.0 mole of isocyanate-reactive groups, multiplied by 100.

The isocyanate component may include one or more isocyanate such as polyisocyanate and/or isocyanate-terminated prepolymer. The isocyanate may be isocyanate-containing reactants that are aliphatic, cycloaliphatic, alicyclic, arylaliphatic, and/or aromatic polyisocyanates or derivatives thereof. Exemplary derivatives include allophanate, biuret, and NCO (isocyanate moiety) terminated prepolymer. For example, the isocyanate component may include at least one aromatic isocyanate, e.g., at least one aromatic polyisocyanate or at least one isocyanate-terminated prepolymer derived from an aromatic polyisocyanate. The isocyanate component may include as at least one isomer of toluene diisocyanate (TDI), crude TDI, at least one isomer of diphenyl methylene diisocyanate (MDI), crude MDI, and/or higher functional methylene polyphenyl polyisocyanate. Examples include TDI in the form of its 2,4 and 2,6-isomers and mixtures thereof and MDI in the form of its 2,4'-, 2,2'- and 4,4'-isomers and mixtures thereof. The mixtures of MDI and oligomers thereof may be crude or polymeric MDI and/or a known variant of MDI comprising urethane, allophanate, urea, biuret, carbodiimide, uretonimine and/or isocyanurate groups. Exemplary isocyanates include VORANATE™ M 220 (a polymeric methylene diphenyl diisocyanate available from The Dow Chemical Company). Other exemplary polyisocyanate include tolylene diisocyanate (TDI), isophorone diisocyanate (IPDI) and xylene diisocyanates (XDI), and modifications thereof.

Polyurethane Foam

The polyurethane foam may be useful in a variety of packaging applications, comfort applications (such as mattresses—including mattress toppers, pillows, furniture, seat cushions, etc.) shock absorber applications (such as bumper pads, sport and medical equipment, helmet liners, etc.), and noise and/or vibration dampening applications (such as earplugs, automobile panels, etc.).

The polyurethane foam may be prepared in a slabstock process (e.g., as free rise foam), a molding process (such as in a box foaming process), or any other process known in the art. In a slabstock process, the components may be mixed and poured into a trough or other region where the formulation reacts, expands freely in at least one direction, and cures. Slabstock processes are generally operated continuously at commercial scales. In a molding process, the components may be mixed and poured into a mold/box (heated or non-heated) where the formulation reacts, expands without the mold in at least one direction, and cures.

The polyurethane foam may be prepared at initial ambient conditions (i.e., room temperature ranging from 20° C. to 25° C. and standard atmospheric pressure of approximately 1 atm). For example, the polyurethane foam may include an acid polymer and/or an acid-modified polyolefin polymer (e.g., a polymer that has a melting point above 100° C.) without requiring heating or application of pressure to the isocyanate-reactive component. Foaming at pressure below atmospheric condition can also be done, to reduce foam density and soften the foam. Foaming at pressure above atmospheric condition can be done, to increase foam density and therefore the foam load bearing as measured by indentation force deflection (IFD). In a molding processing, the polyurethane foam may be prepared at initial mold temperature above ambient condition, e.g., 50° C. and above. Overpacking of mold, i.e. filling the mold with extra foaming material, can be done to increase foam density.

The calculated total water content for the reaction system used to form the polyurethane foam may be less than 5 wt %, less than 3 wt %, less than 2.0 wt %, and/or less than 1.6 wt %, based on the total weight of the reaction system for forming the polyurethane foam. The calculated total water content is calculated as the total amount of DI (deionized water) added to the formulation plus the amount of water added to the formulation as part of the preformed aqueous polymer dispersion. For example, the calculated total water content may be from 0.5 wt % to 5.0 wt %, 0.5 wt % to 4.5 wt %, and/or 1.0 wt % to 4.0 wt %.

All parts and percentages are by weight unless otherwise indicated. All molecular weight data is based on number average molecular weight, unless indicated otherwise.

EXAMPLES

The materials principally used as the following:

AD 1 An aqueous dispersion of an aqueous acid-modified ethylene based copolymer, at a solids content from 40.5 wt % to 43.5 wt %, based on the total weight of the aqueous dispersion (available as HYPOD™ 8503 from The Dow Chemical Company and enabled with BLUEWAVE™ Technology).

AD 2 An aqueous acid polymer dispersion including approximately 21.7 wt % of a potassium hydroxide neutralized ethylene-acrylic acid copolymer salt and 78.3 wt % of water, made using a twin screw extruder and a dilution scheme as described in U.S. Pat. No. 8,318,257, is prepared as follows:

A first feed includes 100 wt % of PRIMACOR™ 5986 (an ethylene acrylic acid resin having approximately 20.5 wt % of acrylic acid) at a flow rate of 234 lb/h, a second feed includes 100 wt % of potassium hydroxide at a flow rate of 125 lb/h, and a third feed includes 100 wt % of water at a flow rate of 50 lb/h. A first dilution pump feeds water at 220 lb/h and a second dilution pump at 538 lb/h to achieve the desired solids content. The barrel/zone temperature control conditions are the following:

TABLE 1

| Zone Number | Temperature ° C. |
| --- | --- |
| Zone 1 | 27 |
| Zone 2 | 151 |
| Zone 3 | 147 |
| Zone 4 | 148 |
| Zone 5 | 161 |
| Zone 6 | 149 |
| Zone 7 | 107 |
| Zone 8 | 109 |
| Zone 9 | 80 |
| Zone 10 | 131 |
| Zone 11 | 72 |
| Zone 12 | 72 |

Polyol 1 A polyoxypropylene-polyoxyethylene polyether polyol initiated with glycerine, having an ethylene oxide content of less than 20 wt %, a hydroxyl functionality of 2.7, a hydroxyl number of 54 mg KOH/g, and an hydroxyl equivalent weight of approximately 1,148 g/mol equivalents (available as VORANOL™ 3136 and VORANOL™ 8136 from The Dow Chemical Company, whereas Example 4 and Comparative Example C use VORANOL™ 8136, and the other examples use VORANOL™ 3136).

Polyol 2 A polyoxypropylene-polyoxyethylene polyether polyol initiated with a blend of glycerol and sucrose, having an ethylene oxide content of less than 20 wt % (approximately 15-16 wt %), a hydroxyl functionality of approximately 4.2, a hydroxyl number of between approximately 29.0 and 33.0 mg KOH/g, an hydroxyl equivalent molecular weight of approximately 1810 g/mol equivalents, and a primary OH percentage of approximately 79% (available as VORANOL™ WJ 4001 from The Dow Chemical Company).

Polyol 3 Styrene acrylonitrile-based copolymer polyol with 43% solid content especially designed for the production of high-resilience (HR) and combustion modified high-resilience (CMHR) flexible slabstock foams, with a hydroxyl number of 31 mg KOH/g (available as VORALUX™ WH 4043 from The Dow Chemical Company).

Polyol 4 A polyoxyethylene-polyoxypropylene random copolymer polyether polyol initiated with sucrose/glycerin, having an ethylene oxide content of greater than 70 wt %, a hydroxyl functionality of 6.9, a hydroxyl number of approximately 31 mg KOH/g, and an hydroxyl equivalent weight of approximately 1800 g/mol equivalents (available as VORANOL™ 4053 from The Dow Chemical Company and usable as a cell opener).

Isocyanate A toluene diisocyanate—TDI (available as VORANATE™ T-80 from The Dow Chemical Company).

Surfactant 1 An organosilicone surfactant (available as Niax™ L-620 from Momentive Performance Materials).

Surfactant 2 A silicone surfactant (available as Niax™ U-2000 from Momentive Performance Materials).

Surfactant 3 A silicone surfactant (available as Niax™ L-618 from Momentive Performance Materials).

Amine 1 A tertiary amine catalyst (available Dabco® BLV from Air Products).

Amine 2 A tertiary amine catalyst (available as Dabco® 33-LV from Air Products).

Amine 3 An amine catalyst including 70 percent bis(2-dimethylaminoethyl) ether (available as Niax™ A-1 from Momentive Performance Materials).

Amine 4 A tertiary amine catalyst (available as Dabco® BL-11 from Air Products).

Tin 1 A tin catalyst (available as KOSMOS® 29 from Evonik Industries).

Tin 2 A dibutyltin dilaurate tin catalyst (available as Dabco® T-12 from Air Products).

Tin 3 A dibutyltin dilaurate tin catalyst (available as Dabco® T-9 from Air Products).

FR A tris(1,3-dichloroisopropyl)phosphate based flame retardant (available as Fyrol® FR-2 from Akzo).

DI Deionized Water.

Working Example 1 and Comparative Examples A are conventional foam samples that are prepared according to the formulations in Table 2, below. In both cases, total formulation mass is set to be 850 grams. Working Example 1 is prepared using AD 1, which is a preformed aqueous acid dispersion. Comparative Example A is prepared using only water, i.e., not using a dispersion. The density of Working Example 1 is 1.47 lb/ft³ and the density of Comparative Example A is 1.39 lb/ft³ (according to ASTM D 3574).

TABLE 2

| | Ex. 1 | Ex. A |
|---|---|---|
| Isocyanate-Reactive Component (amount based on parts by weight) | | |
| AD 1 | 1.00 | — |
| DI | 3.93 | 4.5 |
| Polyol 1 | 100.00 | 100.00 |
| Surfactant 1 | 0.30 | 0.30 |
| Amine 1 | 0.15 | 0.15 |
| Tin 1 | 0.20 | 0.20 |
| Isocyanate Component (amount based on parts by weight) | | |
| Isocyanate | 56.44 | 56.44 |
| Composition Properties | | |
| Approximate Total Parts | 162 | 162 |
| Index | 108 | 108 |
| wt % of AD 1 in Isocyanate-Reactive Component | 0.9 | — |
| Calculated Total Water Content (parts by weight) | 4.50 | 4.50 |
| Foam Properties | | |
| Air Flow (scfm) | 6.1 | 4.2 |
| Average Resiliency (%) | 40 | 36 |
| IFD @ 25% Deflection (lb) | 33.7 | 46.3 |
| IFD @ 65% Deflection (lb) | 71.6 | 91.7 |
| IFD @ 25% Return (lb) | 24.7 | 30.2 |
| IFD Hysteresis (%) | 73 | 65 |

Working Examples 2 and 3 and Comparative Example B are high resiliency foam samples prepared according to the formulations in Table 3, below. In both cases, total formulation mass is set to be 1300 grams Working Examples 2 and 3 are prepared using AD 1, which is a preformed aqueous acid dispersion. Comparative Example B is prepared using only water, i.e., not using a dispersion. The density of each of Working Examples 2 and 3 and Comparative Example B is approximately 1.9 lb/ft³ (according to ASTM D 3574).

TABLE 3

| | Ex. 2 | Ex. 3 | Ex. B |
|---|---|---|---|
| Isocyanate-Reactive Component (amount based on parts by weight) | | | |
| AD 1 | 1.00 | 0.25 | — |
| DI | 2.78 | 2.71 | 2.85 |
| Polyol 2 | 72.00 | 72.00 | 72.00 |
| Polyol 3 | 28.00 | 28.00 | 28.00 |
| Polyol 4 | 1.50 | 1.50 | 1.50 |
| Surfactant 2 | 1.15 | 1.15 | 1.15 |
| Amine 2 | 0.15 | 0.15 | 0.15 |
| Amine 3 | 0.05 | 0.05 | 0.05 |
| Tin 2 | 0.04 | 0.04 | 0.04 |
| FR | 4.00 | 4.00 | 4.00 |
| Isocyanate Component (amount based on parts by weight) | | | |
| Isocyanate | 42.30 | 42.30 | 42.30 |
| Composition Properties | | | |
| Approximate Total Parts | 154 | 154 | 154 |
| Index | 108 | 108 | 108 |
| wt % of AD1 in Isocyanate-Reactive Component | 0.9 | 0.2 | — |
| Calculated Total Water Content (parts by weight) | 2.85 | 2.85 | 2.85 |
| Foam Properties | | | |
| Air Flow (scfm) | 1.4 | 1.6 | 1.1 |
| Average Resiliency (%) | 60 | 56 | 56 |
| IFD @ 25% Deflection (lb) | 30.0 | 23.9 | 29.4 |
| IFD @ 65% Deflection (lb) | 72.6 | 55.0 | 68.9 |

TABLE 3-continued

|  | Ex. 2 | Ex. 3 | Ex. B |
| --- | --- | --- | --- |
| IFD @ 25% Return (lb) | 23.9 | 19.3 | 23.2 |
| IFD Hysteresis (%) | 80 | 81 | 79 |

A Comparative Example in which there is an attempt at preparing a polyurethane foam using ethylene-acrylic acid copolymer and water that are added separately, i.e., not using a preformed dispersion, is not included herein. In particular, due to the inability of ethylene-acrylic acid copolymer to dissolve in water at ambient conditions (it is believe, without intending to be bound by this theory, that a temperature of at least approximately 120° C. would be needed to melt the ethylene-acrylic acid copolymer crystals in water) such a mixture would be non-preferred and/or unsuitable for use in a foaming reaction for forming a polyurethane foam. In other words, it is believed, the high temperature required to obtain solubility would be non-preferred and/or unsuitable for the purpose herein and/or non-dissolved ethylene-acrylic acid copolymer crystals would be non-preferred and/or unsuitable for the purpose herein.

For each of the Working Examples and Comparative Examples, foam samples are prepared by box foaming at ambient conditions, under a fume hood using a 38 cm×38 cm×24 cm (15"×15"×9.5") wooden box lined with clear plastic film. For Working Examples 2 and 3 as well as for Comparative Example B, a 16-pin (4 pins each in four radial directions that are separated by 90°) mixer at high rotation speed is used at high rotation speed setting, together with a 1 gallon cup (16.5 cm diameter, 18 cm tall); for Working Example 1 and for Comparative Example A, a ½ gallon cup was used. The components in the Isocyanate-Reactive Component, with the exception of the Tin catalyst, are mixed first for 15 seconds at 2400 rpm (1500 rpm for Working Example 1 and for Comparative Example A). Then, the Tin catalyst is added and immediately mixed for another 15 seconds at 2400 rpm (1500 rpm for Working Example 1 and for Comparative Example A). Next, the Isocyanate Component is added and immediately mixed for another 3 seconds at 3000 rpm (2400 rpm for Working Example 1 and for Comparative Example A). Then, the mixed Isocyanate-Reactive Component and Isocyanate Component is poured into the box lined with plastic film. The foam is observed as having reached maximum height when bubbles appear at the top surface of the foam. Once foaming is complete, the foam is further allowed to cure overnight under the fume hood. Foam sample walls are discarded, and the remaining samples are characterized.

Calculated Total Water Content (parts by weight) is calculated as the total amount of DI (deionized water) added to the formulation plus the amount of water added to the formulation as part of the aqueous dispersion.

Air flow is a measure of the air that is able to pass through the foam under a given applied air pressure. Air flow is measured as the volume of air which passes through a 1.0 inch (2.54 cm) thick×2 inch×2 inch (5.08 cm) square section of foam at 125 Pa (0.018 psi) of pressure. Units are expressed in standard cubic feet per minute (scfm). A representative commercial unit for measuring air flow is manufactured by TexTest AG of Zurich, Switzerland and identified as TexTest Fx3300. Herein, air flow is measured according to ASTM D 3574.

Average resiliency is measured according to ASTM D 3574, in particular using the ball rebound test.

IFD is referred to as indentation force deflection and it is measured according to ASTM D 3574. IFD is defined as the amount of force in pounds required to indent a fifty square inch sample a certain percentage of the sample's original thickness. Herein, IFD is specified as the number of pounds at 25% deflection and at 65% deflection for the foam sample. Lower IFD values are sought for polyurethane foams. For example, an IFD at 25% from 6 to 12 may be used for bed pillows, thick back pillows, etc. An IFD at 25% from 12 to 18 may be used for medium thickness back pillows, upholstery padding, etc. An IFD at 25% from 18 to 24 may be used for thin back pillows, tufting matrix, very thick seat cushions, etc. An IFD at 25% greater than 24 may be used for average to firmer seat cushions, firm mattresses, shock absorbing foams, packaging foams, carpet pads, and other uses requiring ultra-firm foams.

IFD at 25% Return is the ability of the foam to recover. In particular, the IFD at 25% Return is measured as the percentage of the IFD at 25% that is recovered after cycling through the IFD at 65% measurement and returning to 25% compression.

IFD Hysteresis is the ratio of IFD at 25% Return to the IFD at 25%. So for example, if the IFD at 25% Return is 24 lb and the IFD at 25% is 30 lb, then the IFD Hysteresis is 80%. The IFD Hysteresis measured based on IFD at 25% Return and IFD at 25%, both of which are measured according to ASTM D 3574.

Working Example 4 and Comparative Example C, are a further evaluation of airflow values for a conventional foam samples foam product, pre-crushing, prepared using a Varimax™ 300 pilot "Slabline" foaming equipment (manufactured by Periphlex Ltd.). The equipment is built to industry standards but on a slightly smaller scale, with a block size of 54 inches wide by 96 inches long by 26 to 33 inches high. Total flow rate is such that Polyol 1 is fed at a rate of 120 $lb_m$ per minute. Component process temperatures are 70° F.; mix head pressure is held between 4 and 7 psig; conveyor speed is between 11 and 15 feet per minute. The trough size for all of the experiments is 24 liters. Run time per experiment is between 1 and 2 minutes. All other streams are injected through high pressure nozzles. The isocyanate component pressure is between 600 and 900 psig and is added in an amount to achieve the indicated index. All other streams are injected at between 200 and 600 psig.

TABLE 4

|  | Ex. 4 | Ex. C |
| --- | --- | --- |
| Isocyanate-Reactive Component (amount based on parts by weight) | | |
| AD 2 | 1.0 | — |
| DI | 3.5 | 3.5 |
| Polyol 1 | 100.00 | 100.00 |
| Surfactant 3 | 0.80 | 0.80 |
| Amine 2 | 0.12 | 0.12 |
| Amine 4 | 0.04 | 0.04 |
| Tin 3 | 0.20 | 0.20 |
| Isocyanate Component (amount based on parts by weight) | | |
| Isocyanate | 44.36 | 44.36 |
| Composition Properties | | |
| Approximate Total Parts | 150 | 150 |
| Index | 105 | 105 |
| wt % of AD 2 in Isocyanate-Reactive Component | 0.9 | — |

TABLE 4-continued

|  | Ex. 4 | Ex. C |
| --- | --- | --- |
| Foam Properties | | |
| Air Flow (scfm) | 4.7 | 3.8 |

Air flow is measured according to ASTM D 3574. Referring to Working Example 4 it is shown that good air flow is receiving even for larger foam samples when using a preformed dispersion.

As used herein, the term "tear strength" is used herein to refer to the maximum average force required to tear a foam sample which is pre-notched with a slit cut lengthwise into the foam sample. The test results are determined according to the procedures of ASTM D3574-F in pounds per linear inch (lb/in) or in newtons per meter (N/m).

The invention claimed is:

1. A reaction system for forming a polyurethane foam that has a resiliency greater than 20% as measured according to ASTM D 3574, the reaction system comprising:
   an isocyanate component that includes at least one isocyanate, an isocyanate index of the reaction system being from 70 to 150; and
   an isocyanate-reactive component that is a mixture formed by combining at least a polyol component, an additive component, and a preformed aqueous polymer dispersion, the mixture including:
      from 50.0 wt % to 99.8 wt % of a polyol component, based on the total weight of the mixture, the polyol component including at least one polyether polyol,
      from 0.1 wt % to 50.0 wt % of an additive component, based on the total weight of the mixture, that includes at least one catalyst, and
      from 0.1 wt % to 6.0 wt % of a preformed aqueous polymer dispersion, based on the total weight of the mixture, wherein the preformed aqueous polymer dispersion has a solids content from 10 wt % to 80 wt %, based on the total weight of the preformed aqueous polymer dispersion, is a continuous liquid phase component at ambient conditions of room temperature an atmospheric pressure, and is an aqueous acid polymer dispersion derived from a liquid phase and a solid phase, the liquid phase being water and the solid phase including an ethylene-acrylic acid copolymer, and wherein the ethylene-acrylic acid copolymer has an acrylic acid content of from 10 wt % to 70 wt % based on the weight of the ethylene-acrylic acid copolymer.

2. The reaction system as claimed in claim 1, wherein the preformed aqueous polymer dispersion is separately provided from the polyol component and the additive component.

3. The reaction system as claimed claim 1, wherein the additive component includes at least one surfactant.

4. The reaction system as claimed in claim 1, wherein the additive component includes water that accounts for less than 2.0 wt % of the total weight of the mixture.

5. The reaction system as claimed in claim 1, wherein the polyurethane foam is a high resiliency foam having a resiliency greater than 45%.

6. The reaction system as claimed in claim 1, wherein the polyurethane foam is a flexible foam having a resiliency greater than 20% and up to 45%.

7. A polyurethane foam that has a resiliency of greater than 20%, as measured according to ASTM D 3574, prepared using the reaction system as claimed in claim 1, the polyurethane foam having an air flow of at least 5.0 ft$^3$/min as measured according to ASTM D3574, and a recovery time of less than 20 seconds.

8. A polyurethane foam that has a resiliency of greater than 20% as measured according to ASTM D 3574, prepared using the reaction system as claimed in claim 1, the polyurethane foam having an air flow of greater than 4.5 ft$^3$/min as measured according to ASTM D3574, and a recovery time of less than 20 seconds.

9. A method for forming a polyurethane foam that has a resiliency greater than 20% as measured according to ASTM D 3574, the method comprising:
   preparing an isocyanate-reactive component by mixing at least a polyol component, an additive component, and a preformed aqueous dispersion, the resultant mixture including:
      from 50.0 wt % to 99.8 wt % of a polyol component, based on the total weight of the mixture, the polyol component including at least one polyether polyol,
      from 0.1 wt % to 50.0 wt % of an additive component, based on the total weight of the mixture, that includes at least one catalyst and at least one surfactant, and
      from 0.1 wt % to 6.0 wt % of a preformed aqueous polymer dispersion, based on the total weight of the mixture, wherein the preformed aqueous polymer dispersion has a solids content from 10 wt % to 80 wt % based on the total weight of the preformed aqueous polymer dispersion, is a continuous liquid phase component at ambient conditions of room temperature and atmospheric pressure, and is an aqueous acid polymer dispersion derived from a liquid phase and a solid phase, the liquid phase being water and the solid phase including an ethylene-acrylic acid copolymer, and wherein the ethylene-acrylic acid copolymer has an acrylic acid content of from 10 wt % to 70 wt % based on the weight of the ethylene-acrylic acid copolymer;
   providing an isocyanate component that includes at least one isocyanate such that an isocyanate index of the reaction system is from 70 to 150; and
   allowing the isocyanate component to react with the isocyanate-reactive component to form the polyurethane foam.

* * * * *